July 4, 1967 P. D. SULLIVAN 3,329,376
SHORT TAKEOFF AND LANDING AIRCRAFT
Filed Sept. 7, 1965 4 Sheets-Sheet 1

INVENTOR.
PAUL D. SULLIVAN
BY
Russell, Chittick & Pfund

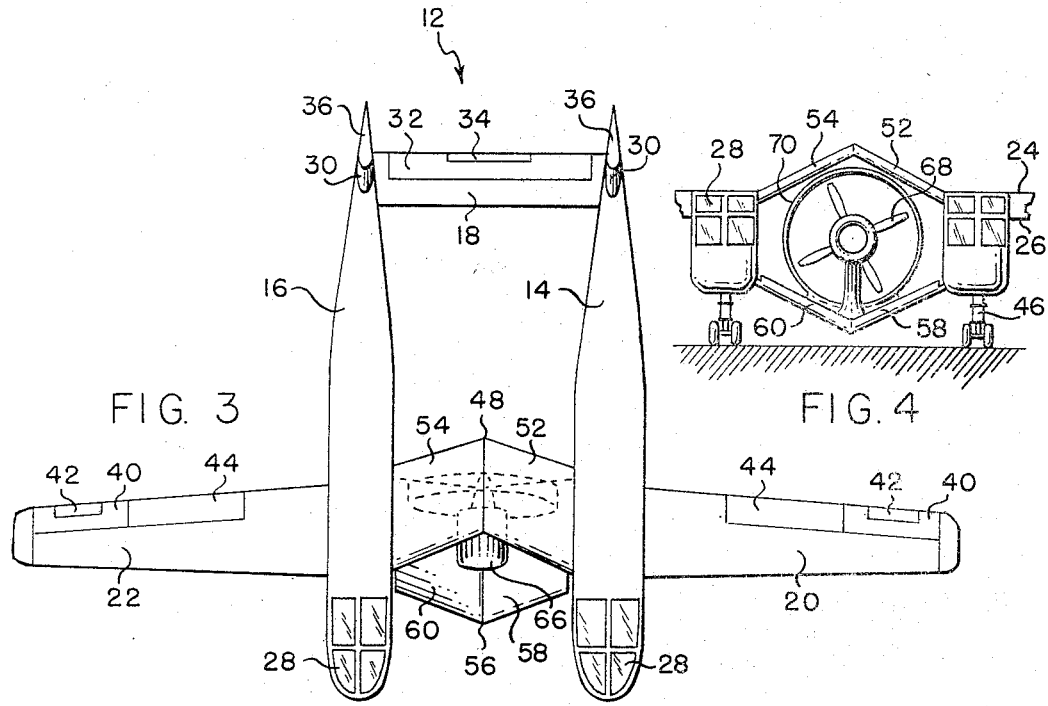
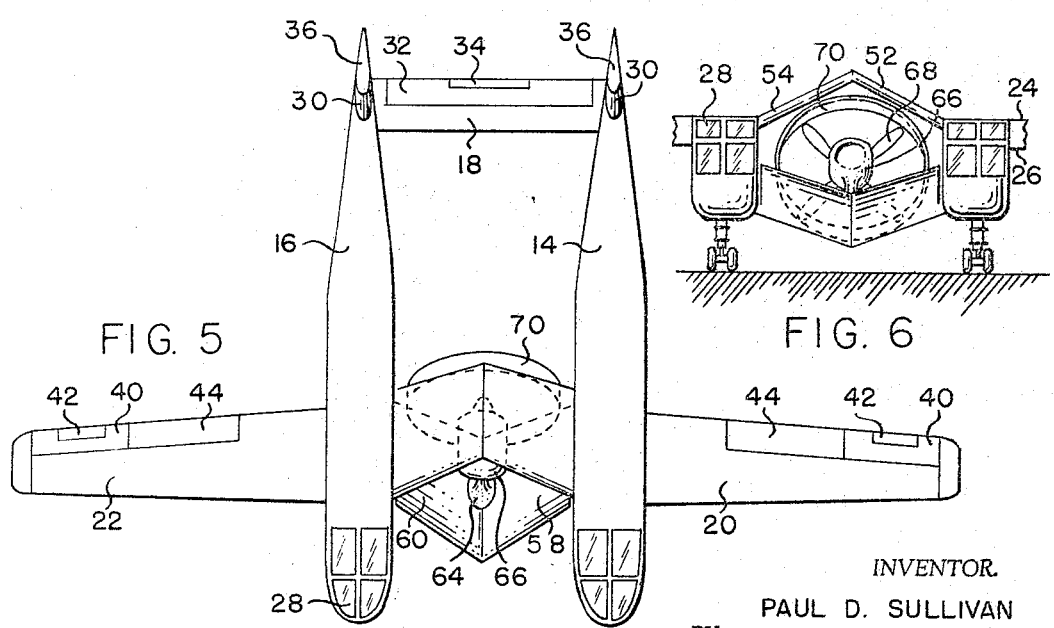

July 4, 1967  P. D. SULLIVAN  3,329,376
SHORT TAKEOFF AND LANDING AIRCRAFT
Filed Sept. 7, 1965  4 Sheets-Sheet 4

INVENTOR.
PAUL D. SULLIVAN

United States Patent Office 3,329,376
Patented July 4, 1967

3,329,376
SHORT TAKEOFF AND LANDING AIRCRAFT
Paul D. Sullivan, 15 Juniper Lane,
Medfield, Mass. 02052
Filed Sept. 7, 1965, Ser. No. 485,448
8 Claims. (Cl. 244—12)

This invention relates to aircraft of the type generally designated as short takeoff and landing vehicles (STOL) and, more particularly to an improved version thereof having superior low speed handling characteristics during takeoff and landing and an economical high speed cruise configuration.

In recent years, the aircraft industry has recognized the military and commercial advantages of an aircraft which is capable of sustained high speed flight yet is also able to take off from and land on short, unimproved airstrips at relatively low airspeeds without sacrificing aerodynamic stability. During this period, many different proposals have been advanced by those skilled in the art relating to various combinations of movable airframe members and propulsion systems which were designed to fulfill the dual requirements of a true STOL aircraft. A number of STOL aircraft utilized a dual propulsion system having a separate propulsion means for providing the necessary vertical thrust during takeoffs and landings and while the aircraft was in the transitional phase from vertical to horizontal flight. Other STOL aircraft employed a fixed propulsion system coupled with thrust deflectors while still others obtained the required vertical and horizontal thrust components by means of rotating propulsion systems generally in combination with movable airfoil members. In the latter classification, as represented by movable ring airfoils or annular wings, the aerodynamic design of the airframe and lift generating surfaces is at best a compromise between the airfoil requirements of high speed cruising and low speed takeoffs and landings. If the annular airfoil and thrust generating means are positioned correctly to obtain the necessary vertical thrust component, one or more lift generating surfaces are incorrectly positioned to obtain maximum lift during takeoff and landing.

It is accordingly, a general object of the present invention to provide an improved STOL aircraft capable of high speed flight and relatively low speed landings and takeoffs on short and unimproved airstrips.

It is a specific object of the persent invention to provide a STOL aircraft which substantially eliminates the above-mentioned disadvantages of a movable, annular airfoil aircraft.

It is another object of the invention to provide a STOL aircraft having excellent handling characteristics during landing and takeoff in addition to a stable, high speed flight configuration.

It is another object of the invention to provide a relatively uncomplicated mechanical and aerodynamic means for obtaining the aforementioned flight characteristics.

It is a feature of the invention that the airframe, movable airfoil surfaces, propulsion means and associated components can be fabricated from conventional materials and structures that are currently employed in the aviation industry.

It is a further object of the invention to reduce the low speed drag on the STOL aircraft during takeoffs and landing by providing an improved airflow pattern across the movable airfoil surfaces.

These objects and other objects and features of the invention will be apparent from the following description of a preferred embodiment of the invention, selected for purposes of illustration, and shown in the accompanying drawings in which:

FIG. 3 is a plan view of the STOL aircraft showing the movable lift generating surfaces and thrust means in the cruise position;

FIG. 4 is a front elevation of the STOL aircraft showing the lift generating surfaces and thrust means in the cruise position;

FIG. 5 is a plan view of the STOL aircraft showing the movable lift generator surfaces and thrust means in the takeoff and landing position;

FIG. 6 is a front elevation of the STOL aircraft showing the lift generating surfaces and thrust means in the takeoff and landing position;

Figure 1:
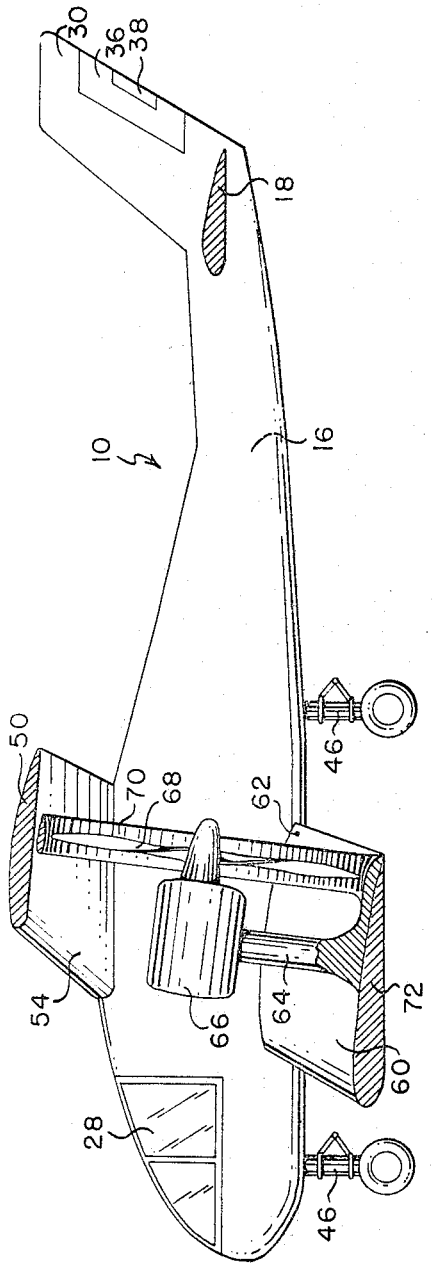
FIG. 1 is a side elevation in partial section of the starboard portion of the STOL aircraft's U-shaped fuselage showing the movable lift generating surfaces and thrust means in the cruise position.

Turning now to the drawings and particularly to FIGURES 1 through 6, thereof, there is shown in plan, front and side elevation an improved STOL aircraft identified generally by the reference numeral 10. The STOL aircraft 10 is depicted in FIGS. 1, 3 and 4 in a "cruise" or high speed configuration and in FIGS. 2, 5 and 6 in a "takeoff and landing" or low speed configuration. Before discussing the structural and corresponding aerodynamic differences between the two configurations, it will be helpful for purposes of understanding the invention to briefly describe the major components of the STOL aircraft which correspond to similar components in a conventional aircraft.

Referring to the "cruise" configuration shown in FIGS. 1, 3 and 4, the STOL aircraft 10 has a generally U-shaped airframe 12 comprising twin fuselages 14 and 16, and a connecting horizontal structural member 18 having a conventional airfoil cross-section. Extending outwardly from the port and starboard fuselages 14 and 16 are two conventional wings 20 and 22, respectively, which have substantially flat, upper and lower surfaces 24 and 26 which define, in cross-section, a conventional airfoil. Since the wings 20 and 22 are horizontal and lie substantially in a single plane, they will be referred to hereinafter as "planar" wings in order to differentiate them from the other wing members described below which do not lie substantially in a single plane.

Both fuselages terminate at the forward end in a cockpit 28 and at the other end in a vertical stabilizer 30. The aircraft's attitude in the pitch, roll and yaw planes is controlled by conventional control surfaces which can best be seen in FIGS. 1 and 3.

In the pitch plane, the connecting structural member 18 between fuselages 14 and 16 functions as a horizontal stabilizer and has a movable central section or elevator 32 positioned along the trailing edge. An elevator trim tab 34 is provided in elevator 32 for trimming the pitch attitude of the aircraft. Movement in the yaw plane is controlled by rudders 36 and their corresponding trim tabs 38. Each planar wing has an aileron 40 and aileron tab 42 to provide control in the roll plane. In addition, each wing also has an adjustable flap 44 located inboard of the aileron 40 along the trailing edge of the wing. The rudder, ailerons and elevator control surfaces are interconnected by means of appropriate mechanical linkages and/or electro-hydraulic means so that selected control surfaces can be actuated from the cockpit 28 to affect changes in aircraft attitude. The mechanical linkages and/or electro-hydraulic actuating systems have not been shown in the drawings because they are well known by those skilled in the art.

Since one of the objects of the present invention is to provide a STOL aircraft which is capable of sustained high speed flight as well as being able to take off from short, unimproved airstrips, each fuselage section is provided with a dual retractable landing gear 46 in order to reduce high speed drag. Other arrangements for the retractable landing gear can, of course, be utilized if so desired.

Having described the components of the STOL aircraft 10 which operate in the same manner as the corresponding components in a conventional aircraft, I will now describe the structure and function of the components of my novel STOL aircraft which distinguish it from a conventional aircraft. As shown in FIGS. 1–6, the port and starboard fuselages 14 and 16 are interconnected at a position just forward of their midpoint by a fixed wing member 48 having a conventional airfoil 50 shown in cross-section in FIG. 1. The fixed upper wing member 48 comprises anhedral i.e., negative dihedral, airfoil surfaces 52 and 54. The two airfoil surfaces of the upper wing member are swept forwardly as can be seen from the inspection of the plan view shown in FIG. 3. A similar, but movable lower wing member 56 is positioned between the port and starboard fuselages and pivotally secured thereto. The lower wing member 56 comprises dihedral (positive) airfoil surfaces 58 and 60 which are pivotally secured to the fuselage sections at a point located substantially at their trailing edge and identified in FIGURES 1 and 2 of the drawings by the reference numeral 62.

Mounted on and, hence, movable with the lower wing member 56 is a pylon 64 which supports a propulsion system comprising an engine 66 and a propeller 68. In the preferred embodiment of the STOL aircraft shown in the drawings, the engine 66 has been depicted as a conventional internal combustion engine. However, a gas turbine or any other source of mechanical power having a high ratio of power to weight can be employed to drive propeller 68. The engine driven propeller 68 rotates within an annular shroud 70 which is affixed to the lower wing member 56 substantially along the trailing edge and movable therewith. It should be understood that the mounting of the propulsion system described herein and shown in the drawings is merely illustrative and that other arrangements for mounting the engine propeller and shroud can be employed. For example, these components can be pivotally secured to the port and starboard fuselages 14 and 16 and rotated as a unit in synchronism with the movable lower wing member 56 as described hereinafter.

Figure 2:
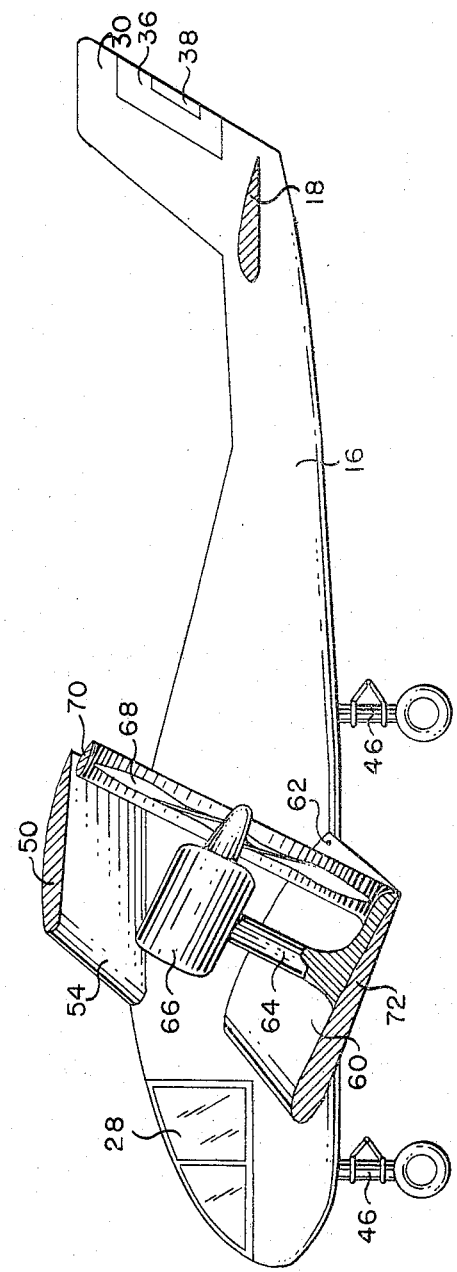
FIG. 2 is the same view as shown in FIG. 1 with the exception that the movable lift generating surfaces and thrust means are depicted in the takeoff and landing position.
Figure 10:
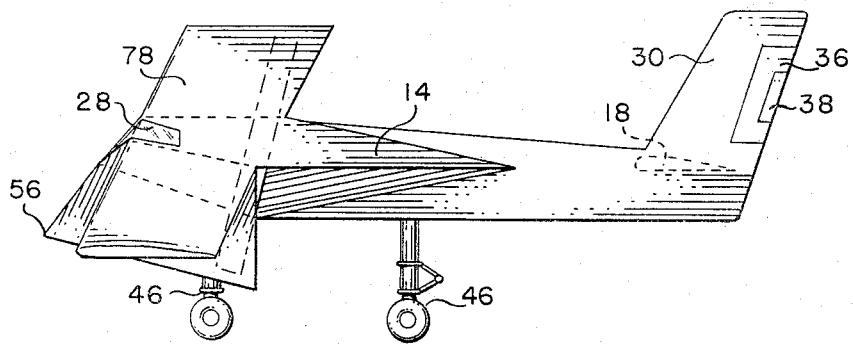

Referring now to FIGS. 1 and 2 which represent, respectively, the "cruise" and "takeoff and landing" configurations of the STOL aircraft, it can be seen that in the takeoff and landing configuration, the lower wing member 56 has a high angle of attack with respect to the horizontal plane of the ground surface. As shown in the drawings, the axis of revolution of propeller 68 has a similar high angle of attack, albeit slightly greater than the angle of attack of the lower wing member 56. However, these two angles can be identical, i.e., the axis of revolution is parallel to the airfoil chord of the lower wing member 56 if maximum speed in the "cruise" configuration is desired.

In the takeoff and landing configuration, a relatively large effective vertical thrust component is developed by the air stream generated by propeller 68. As soon as the aircraft starts rolling, the upper and lower wing members 48 and 56 provide substantial lift in addition to the lift generated by the planar wings 20 and 22. Once the aircraft has become airborne and is cleaned up, the aircraft enters the transitional phase from the takeoff configuration to the high speed cruise configuration. This transition is accomplished by rotating the lower wing member 56 downwardly in the pitch plane until the chord of the airfoil defined by the intersection of the lower wing member dihedral airfoil surfaces 58 and 60 (reference numeral 72 FIG. 1) is parallel to the chord of the airfoil defined by the intersection of the upper wing member anhedral airfoil surfaces 52 and 54 (reference numeral 50 FIG. 1).

It will be appreciated by those skilled in the art that the parallel relationship between the upper and lower wing member airfoils 50 and 72 provides a low drag profile at high air speeds. In the takeoff and landing position (FIG. 2), the lower wing member 56 is positioned with a high angle of attack and would therefore normally produce considerable turbulence and a concommitant drag on the aircraft. However, by locating the shrouded propeller at substantially the trailing edge of the lower wing member, the air is pulled smoothly across the dihedral airfoil surfaces 58 and 60 thereby producing a laminar air flow pattern which significantly reduces the drag producing air turbulence associated with high angle of attack airfoils.

It should also be noted that in the takeoff and landing position the fixed upper wing member 48 is connectedly positioned to achieve maximum lift with a minimum of drag producing airstream turbulence. This is in distinct contrast to the movable, annular wing STOL aircraft in which the upper portion i.e., airfoil of the annular wing has a high angle of attack and, therefore, produces considerable turbulence in the airstream flowing across the airfoil. In addition to providing a correctly positioned upper wing member airfoil, the short takeoff and landing aircraft of the present invention utilizes the structural relationship of the trailing edge of the upper wing member 48 and the annular shroud 70, as shown in FIG. 2, to provide a smooth and substantially continuous airfoil surface across the upper surfaces of wing member 48 and outside surface of the upper portion of shroud 70. Thus, drag is further reduced in the takeoff and landing configuration.

Although the maximum advantages of the STOL aircraft are obtained by rotating both the lower wing member and propulsion system, an appreciable improvement in the low and high speed handling characteristics can be achieved with a fixed propulsion system and a movable lower wing member. With this arrangement, the reduction in low speed drag is the same as described above, however, high speed performance is slightly less because the thrust angle cannot be varied to suit the particular flight configuration.

Turning now to FIGURES 7 through 10 of the drawings, there is shown in perspective, plan, front and side elevation respectively, an alternative embodiment of the STOL aircraft, identified generally by the reference numeral 74. Since the construction of this embodiment is similar in many respects to the short takeoff and landing aircraft 10 described above, the same reference numerals have been used in FIGURES 7 through 10 to denote the corresponding structural components shown in FIGS. 1–6.

The STOL aircraft 74 differs from the previously described short takeoff and landing aircraft 10 in that the propulsion system and lower wing member 56 are fixed with respect to the fuselages 14 and 16 and, therefore, cannot be rotated from a takeoff and landing position to a cruise position. In addition, the alternative embodiment of the STOL aircraft has a pair of anhedral i.e. negative dihedral wings 76 and 78 which form the forward, upper surfaces of fuselages 14 and 16. The anhedral wings 76 and 78 intersect at a location above and between the twin fuselages 14 and 16 in the vertical plane of symmetry.

Figure 7:
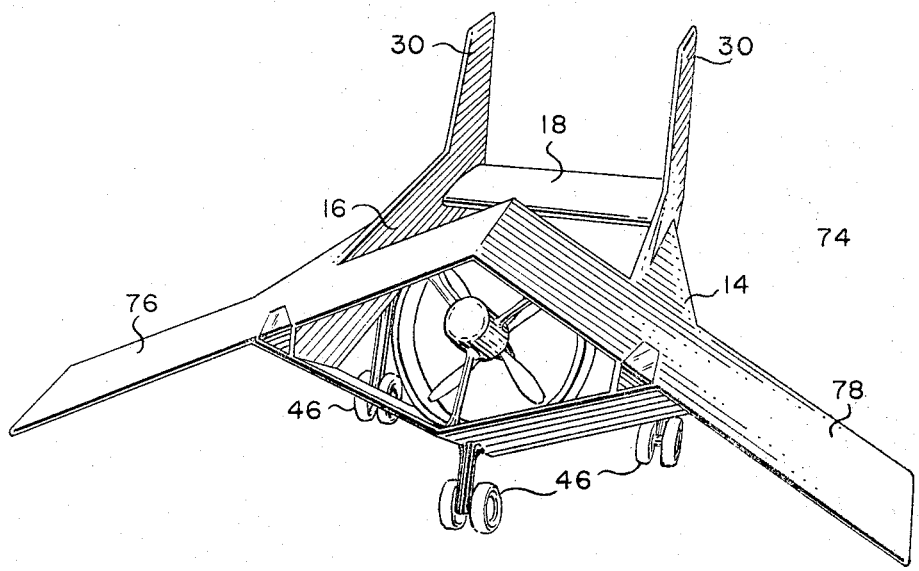
FIG. 7 is a perspective view of an alternative embodiment of the STOL aircraft having fixed lift generating surfaces and thrust generating means.
Figure 9:
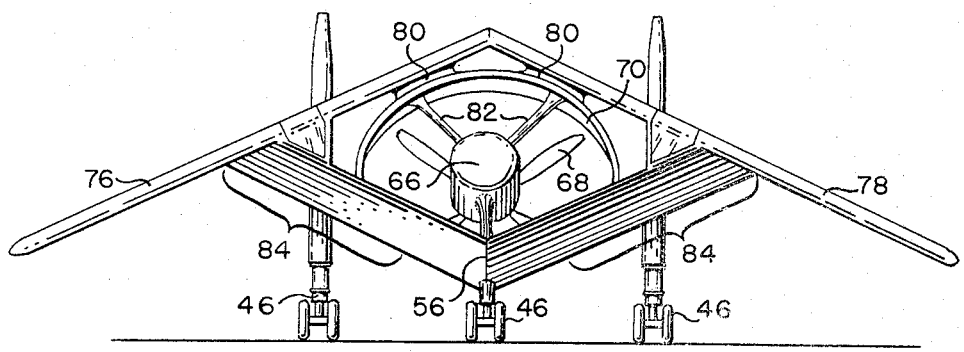
FIG. 9 is a front elevation of the alternative embodiment of the STOL aircraft shown in FIG. 7; and, FIG. 10 is a side elevation of the alternative embodiment of the STOL aircraft shown in FIG. 7.
Figure 8:
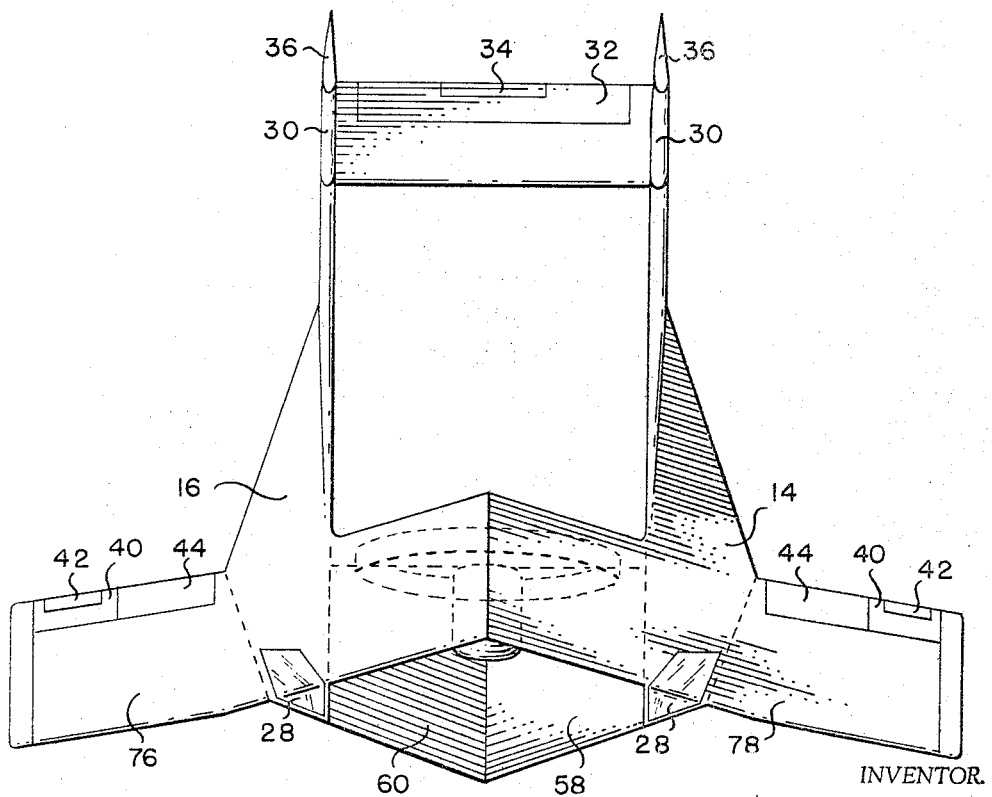
FIG. 8 is a plan view of the alternative embodiment of the STOL aircraft shown in FIG. 7.

It can be seen from an inspection of FIGS. 7, 8 and 9 that the two dihedral airfoil surfaces 58 and 60 of the lower wing member 56 and the anhedral wings 76 and 78 define a diamond shaped zone between the fuselages within which is positioned the propulsion system engine 66, propeller 68 and shroud 70. The shroud 70 is fixed with respect to the anhedral wings and lower ring member by means of struts 80, two of which are visible in FIG. 9. If desired, the shroud 70 can be flared directly into the upper wings 76 and 78 and the lower wing member 56 to provide a substantially integral unit. Struts 82 are used to support the engine 66 as shown in FIGS. 7 and 9. The structural arrangement of the wings, wing member and propulsion system affords the same uniform and smooth laminar airflow across the airfoil surfaces of the lower wing member as described above in connection with the STOL aircraft shown in FIGS. 1–6. Thus it can be seen that the low speed drag normally associated with high angle of attack airfoils is significantly reduced with a concommitant increase in the lift generated by the airfoil surfaces.

Additional lift is generate by the airfoil surfaces of the anhedral wings 76 and 78. The lift generated by the airfoil surfaces of the lower wing member 56 and the anhedral wings 76 and 78 is reinforced in the area where the lower surface of the lower wing member 56 intersects the lower surface of the corresponding anhedral wing. This area is shown in FIG. 9 and identified by the reference numeral 84. It will be appreciated that the sweptback configuration and high angle of attack of the lower wing member 56 forces air outwardly against the lower surfaces of the anhedral wings 76 and 78 thereby increasing the air pressure against the lower surfaces of the anhedral wings. The increased air pressure in area 84 beneath the anhedral wing produces a corresponding increase in the lift generated by the wings. It will also be appreciated that this increased lift is directly attributable to the novel construction of the STOL aircraft and is not found in conventional winged aircraft.

Having described in detail the structure and operation of my short takeoff and landing aircraft, it will now be apparent to those skilled in the art that numerous modifications can be made to the invention without departing from the spirit of the invention.

What I claim is:

1. A short takeoff and landing aircraft comprising: twin fuselages terminating at one end in a vertical stabilizer and having a horizontal stabilizer positioned between and secured to said fuselages at the tail end thereof; a planar wing extending outwardly from and secured to each of said fuselages; a fixed upper wing member positioned between and secured to said fuselages; a lower wing member positioned between and pivotally secured to said fuselages for rotation in the pitch plane from a takeoff and landing position to a cruise position; and, means for generating thrust.

2. A short takeoff and landing aircraft comprising: twin fuselages terminating at one end in a vertical stabilizer and having a horizontal stabilizer positioned between and secured to said fuselages at the tail end thereof; a planar wing extending outwardly from and secured to each of said fuselages; a fixed upper wing member having anhedral airfoil surfaces positioned between and secured to said fuselages; a lower wing member having dihedral airfoil surfaces positioned between and pivotally secured to said fuselages for rotation in the pitch plane from a takeoff and landing position to a cruise position; and, means for generating thrust, said thrust means being rotatable in synchronism with said lower wing member.

3. A short takeoff and landing aircraft comprising: twin fuselages terminating at one end in a vertical stabilizer and having a horizontal stabilizer positioned between and secured to said fuselages at the tail end thereof; a planar wing extending outwardly from and secured to each of said fuselages; a fixed, forwardly swept upper wing member having anhedral airfoil surfaces positioned between and secured to said fuselages; a lower swept back wing member having dihedral airfoil surfaces positioned between and pivotally secured to said fuselages for rotation in the pitch plane from a takeoff and landing position to a cruise position; and means for generating thrust, said thrust means being rotatable in synchronism with said lower wing member.

4. The aircraft of claim 3 further characterized by said upper wing member and said lower wing member being reverse staggered.

5. The aircraft of claim 3 further characterized by said movable wing member being pivotally secured to said fuselages at substantially the trailing edges of said dihedral airfoil surfaces so that said wing member rotates downwardly in the pitch plane from a takeoff and landing position to a cruise position.

6. A short takeoff and landing aircraft comprising: twin fuselages terminating at one end in a vertical stabilizer and having a horizontal stabilizer positioned between and secured to said fuselages at the tail end thereof; a planar wing extending outwardly from and secured to each of said fuselages; a fixed, forwardly swept upper wing member having anhedral airfoil surfaces positioned between and secured to said fuselages; a lower wing member having dihedral airfoil surfaces positioned between and pivotally secured to said fuselages with the leading edges of said lower wing member located forwardly of the leading edges of said upper wing member, said lower wing member being rotatable downwardly in the pitch plane from a takeoff and landing position to a cruise position; an annular propeller shroud mounted on said lower wing member; and, means for supporting a propulsion system comprising an engine and propeller so that said propeller rotates within said shroud and is movable therewith.

7. The aircraft of claim 6 further characterized by the chords of the airfoils formed by the intersections of the lower wing member dihedral airfoil surfaces and the upper wing member anhedral airfoil surfaces being substantially parallel when the lower wing member is in the cruise position.

8. A short takeoff and landing aircraft comprising: twin fuselages terminating at one end in a vertical stabilizer and having a horizontal stabilizer positioned between and secured to said fuselages at the tail end thereof; a pair of anhedral wings secured to said fuselages, said wings intersecting at a location above and between said fuselages in the vertical plane of symmetry of said aircraft; and, a lower wing member having dihedral airfoil surfaces positioned between and secured to said fuselages, said dihedral airfoil surfaces and said anhedral wings defining a diamond shaped zone between said fuselages within which is positioned a means for generating thrust.

References Cited

UNITED STATES PATENTS

| | | | |
|---|---|---|---|
| 1,264,037 | 4/1918 | Emmons | 244—45 |
| 3,049,320 | 8/1962 | Fletcher | 244—12 |

MILTON BUCHLER, *Primary Examiner.*

A. E. CORRIGAN, *Assistant Examiner.*